United States Patent
Yoshioka et al.

(10) Patent No.: US 10,946,887 B2
(45) Date of Patent: Mar. 16, 2021

(54) STEERING DEVICE AND CARGO HANDLING VEHICLE

(71) Applicant: Mitsubishi Logisnext Co., Ltd., Kyoto (JP)

(72) Inventors: Masahiro Yoshioka, Kyoto (JP); Takuya Sano, Kyoto (JP)

(73) Assignee: MITSUBISHI LOGISNEXT CO., LTD., Kyoto (JP)

( * ) Notice: Subject to any disclaimer, the term of this patent is extended or adjusted under 35 U.S.C. 154(b) by 85 days.

(21) Appl. No.: 16/407,418

(22) Filed: May 9, 2019

(65) Prior Publication Data

US 2019/0359244 A1 Nov. 28, 2019

(30) Foreign Application Priority Data

May 28, 2018 (JP) .............................. JP2018-101488

(51) Int. Cl.
*B62D 1/189* (2006.01)
*B66F 9/075* (2006.01)
*B62D 1/184* (2006.01)

(52) U.S. Cl.
CPC .............. *B62D 1/189* (2013.01); *B62D 1/184* (2013.01); *B66F 9/07568* (2013.01); *B60Y 2200/15* (2013.01); *B60Y 2304/01* (2013.01)

(58) Field of Classification Search
CPC ..... B66F 9/07568; B62D 1/183; B62D 1/184; B62D 1/189; B60Y 2200/15; B60Y 2304/01
See application file for complete search history.

(56) References Cited

U.S. PATENT DOCUMENTS

| | | | | | |
|---|---|---|---|---|---|
| 3,167,971 | A | * | 2/1965 | Wight | H01H 25/04 74/493 |
| 3,548,675 | A | * | 12/1970 | Grimes | B62D 1/184 74/493 |
| 3,678,778 | A | * | 7/1972 | Groves | B62D 1/184 74/493 |
| 3,691,866 | A | * | 9/1972 | Berkes | B62D 1/184 74/493 |
| 3,700,257 | A | * | 10/1972 | Hurlburt | B62D 1/184 280/775 |

(Continued)

FOREIGN PATENT DOCUMENTS

| | | |
|---|---|---|
| CN | 2467371 Y | 12/2001 |
| EP | 1048547 A2 * 11/2000 | ............. B62D 1/184 |

(Continued)

*Primary Examiner* — Laura Freedman
(74) *Attorney, Agent, or Firm* — Kirschstein, Israel, Schiffmiller & Pieroni, P.C.

(57) ABSTRACT

A cargo handling vehicle includes a universal joint that allows an upper shaft to swing with respect to a lower shaft around a predetermined horizontal axis, a column tube that covers an outer periphery of the upper shaft, and a lockable gas spring that supports the upper shaft via the column tube. The gas spring is disposed under the column tube and connects a cowl with the column tube. The column tube has a cowl backing bracket that is disposed on a side of the universal joint and connected to the cowl, and the cowl supports the cowl backing bracket swingably around the horizontal axis.

6 Claims, 7 Drawing Sheets

(56) References Cited

U.S. PATENT DOCUMENTS

| | | | | |
|---|---|---|---|---|
| 3,718,053 A * | 2/1973 | Cinadr | B62D 1/184 | 74/493 |
| 3,799,569 A * | 3/1974 | Baker | B62D 1/184 | 280/775 |
| 3,851,543 A * | 12/1974 | Krom | B62D 1/184 | 74/493 |
| 4,392,670 A * | 7/1983 | Schultz | B62D 1/181 | 180/78 |
| 4,674,769 A * | 6/1987 | Ota | B62D 1/183 | 180/329 |
| 5,088,342 A * | 2/1992 | Bening | B62D 1/184 | 280/775 |
| 5,363,716 A * | 11/1994 | Budzik, Jr. | B62D 1/184 | 280/775 |
| 5,678,454 A * | 10/1997 | Cartwright | B62D 1/184 | 74/493 |
| 6,902,191 B2 * | 6/2005 | Angel | B62D 1/184 | 280/775 |
| 7,174,804 B2 * | 2/2007 | Adoline | B62D 1/184 | 280/775 |
| 7,603,928 B2 * | 10/2009 | Magrini | B62D 1/20 | 74/493 |
| 8,899,129 B2 * | 12/2014 | Isaka | E02F 3/34 | 74/493 |
| 9,180,901 B2 * | 11/2015 | Moriyama | B62D 1/189 | |
| 9,738,305 B2 * | 8/2017 | Kuwabara | B62D 1/184 | |
| 10,442,454 B2 * | 10/2019 | Higashiguchi | B60K 37/06 | |
| 10,766,519 B2 * | 9/2020 | Casini | B62D 1/184 | |
| 2006/0131865 A1 * | 6/2006 | Wasek | B62D 1/184 | 280/775 |
| 2019/0359186 A1 * | 11/2019 | Yoshioka | B60T 7/08 | |

FOREIGN PATENT DOCUMENTS

| | | | | |
|---|---|---|---|---|
| JP | S52-019831 | | 2/1977 | |
| JP | S59-149564 | | 10/1984 | |
| JP | S60-110173 | | 7/1985 | |
| JP | S63-046296 | | 12/1988 | |
| JP | H09-040388 | | 2/1997 | |
| JP | 10081499 A | * | 3/1998 | |
| JP | 11049496 A | * | 2/1999 | |
| JP | H11-334605 | | 12/1999 | |
| JP | 2000203797 A | * | 7/2000 | B62D 5/0418 |
| JP | 2001-213330 | | 8/2001 | |
| JP | 2016-215888 | | 12/2016 | |
| WO | WO-2006108631 A1 | * | 10/2006 | B62D 1/197 |

* cited by examiner

STEERING DEVICE AND CARGO HANDLING VEHICLE

BACKGROUND OF THE INVENTION

1. Field of the Invention

The present invention relates to a steering device and a cargo handling vehicle which have a tilt adjusting function of a steering handle.

2. Description of the Related Art

In general, an upper shaft that configures a steering device of a vehicle is connected to a steering handle and is connected to another shaft via a universal joint (for example, see JP 3069944 B2, JP 2001-213330 A, and JP 63-46296 Y2).

The steering device described in JP 3069944 B2 includes a spring, which lifts an upper shaft when the upper shaft is unfixed, and two universal joints, which configure folding portions.

The steering device described in JP 2001-213330 A includes a column tube provided with upper and lower distance brackets, a universal joint, which connects an upper shaft with an inner shaft, and a universal joint, which connects an outer shaft with an input shaft of an intermediate gear. The distance brackets come into sliding contact with upper and lower tilt brackets fixed to a vehicle body.

The steering device described in JP 63-46296 Y2 includes a universal joint, which connects an upper shaft with a lower shaft, and a universal joint, which connects the lower shaft with an input shaft of a steering gear.

However, in the steering device described in JP 3069944 B2, the spring is disposed on a back side of the upper shaft (that is, front side of the vehicle) and extended in a front-rear direction, and thus a problem arises in that it is difficult to reduce the steering device in size. In the steering device described in JP 2001-213330 A, it is necessary to provide brackets for connection to a main vehicle body at two positions (upper and lower end portions) of the column tube, and thus it is difficult to reduce the steering device in size.

The steering devices described in JP 3069944 B2, JP 2001-213330 A, and JP 63-46296 Y2 each have two universal joints, and thus a problem arises in that the steering devices easily oscillate and are unstable with respect to the main vehicle body.

SUMMARY OF THE INVENTION

The invention is made with consideration for such circumstances described above, and an object thereof is to provide a steering device and a cargo handling vehicle in which it is possible to reduce the steering device in size such that a riding space is not compressed, and it is possible to increase fixing strength of the steering device to a main vehicle body.

In order to solve the problems described above, there is provided a steering device that is connected to a cowl of a main vehicle body, the steering device including: a steering handle; an upper shaft to which the steering handle is connected; a lower shaft that is disposed below the upper shaft and fixed to the main vehicle body; a universal joint that connects the upper shaft with the lower shaft and allows the upper shaft to swing with respect to the lower shaft around a predetermined horizontal axis; a column tube that covers an outer periphery of the upper shaft; and a lock function assigned gas spring that supports the upper shaft via the column tube. The gas spring is disposed under the column tube and connects the cowl with the column tube. The column tube has a cowl backing bracket that is disposed on a side of the universal joint and connected to the cowl, and the cowl backing bracket is supported by the cowl so as to swing around the horizontal axis.

According to the invention, the steering device may further include a tilt lock release lever that releases lock of the gas spring, and the tilt lock release lever may be disposed above the gas spring and under the column tube.

According to the invention, the steering device may further include a valve device to which the lower shaft is connected. The valve device may supply hydraulic oil for steering depending on rotation of the steering handle.

According to the invention, in the steering device, the valve device may be fixed to the cowl.

According to the invention, there is provided a cargo handling vehicle including: a main vehicle body; a cowl that is fixed to the main vehicle body; a steering handle; an upper shaft to which the steering handle is connected; a lower shaft that is disposed below the upper shaft and fixed to the main vehicle body; a universal joint that connects the upper shaft with the lower shaft and allows the upper shaft to swing with respect to the lower shaft around a predetermined horizontal axis; a column tube that covers an outer periphery of the upper shaft; and a lock function assigned gas spring that supports the upper shaft via the column tube. The gas spring is disposed under the column tube and connects the cowl with the column tube. The column tube has a cowl backing bracket that is disposed on a side of the universal joint and connected to the cowl, and the cowl supports the cowl backing bracket swingably around the horizontal axis.

According to the invention, the cargo handling vehicle may further include a tilt lock release lever that releases lock of the gas spring. The tilt lock release lever may be disposed above the gas spring and under the column tube.

According to the invention, the cargo handling vehicle may further include a valve device to which the lower shaft is connected. The valve device may supply hydraulic oil for steering depending on rotation of the steering handle.

According to the invention, in the cargo handling vehicle, the valve device may be fixed to the cowl.

According to the invention, it is possible to provide a steering device and a cargo handling vehicle in which it is possible to reduce the steering device in size such that a riding space is not compressed, and it is possible to increase fixing strength of the steering device to a main vehicle body.

BRIEF DESCRIPTION OF THE DRAWINGS

FIGS. 6A and 6B are views illustrating an attachment structure of the steering device to a main vehicle body according to the embodiment. FIGS. 7A and 7B are views illustrating the attachment structure of the steering device to the main vehicle body according to the embodiment.

DETAILED DESCRIPTION OF THE PREFERRED EMBODIMENTS

Figure 1A:
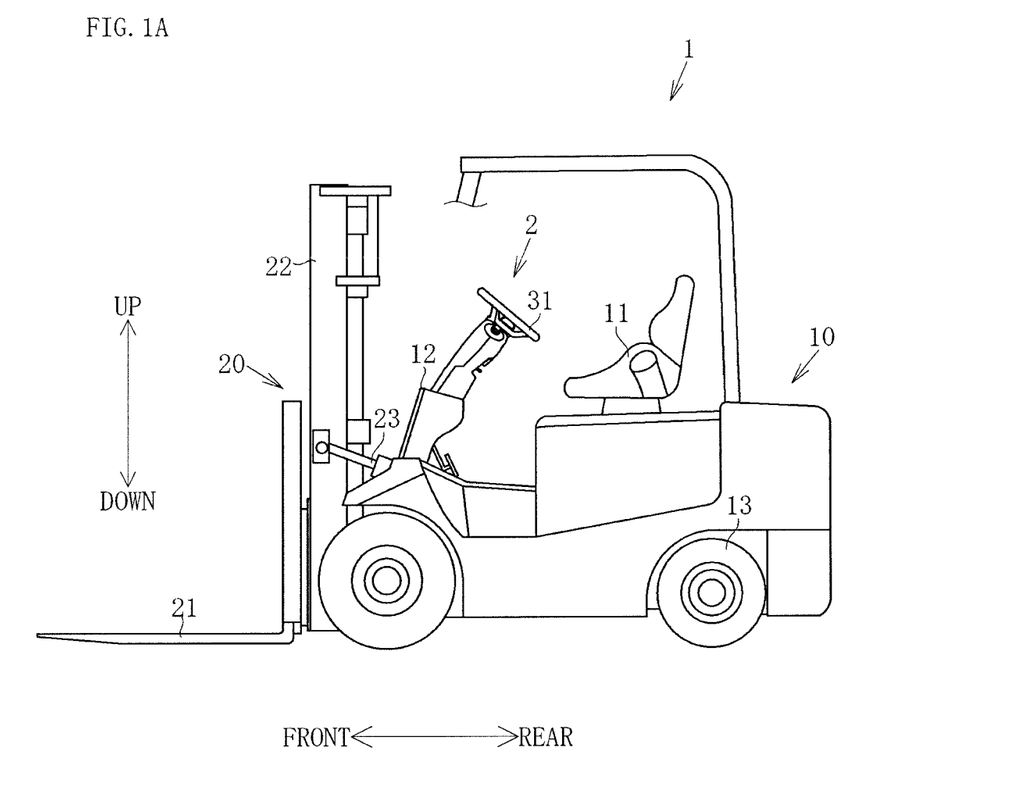
FIG. 1A is an outline view illustrating a schematic configuration of a cargo handling vehicle according to an embodiment of the invention.

An embodiment of the invention will be described with reference to the drawings. FIG. 1A is an outline view of a battery powered counterbalance forklift which is a cargo handling vehicle 1, and FIG. 1B is an outline view of a steering device 2.

As illustrated in FIG. 1A, the cargo handling vehicle 1 includes a main vehicle body 10 on which an operator (not illustrated) gets and a cargo handling device 20 provided in front of the main vehicle body 10. The cargo handling vehicle 1 includes, as elements provided on the main vehicle body 10, a operator seat 11, a cowl 12, vehicle wheels 13, and the steering device 2.

The operator seat 11 is provided such that an operator is seated toward a front side. The cowl 12 is fixed to a front end portion of the main vehicle body 10 and is disposed in front of the operator seat 11 in order to protect the operator who is seated in the main vehicle body 10. The vehicle wheels 13 change an orientation depending on an operation of the steering device 2 by the operator.

Figure 1B:
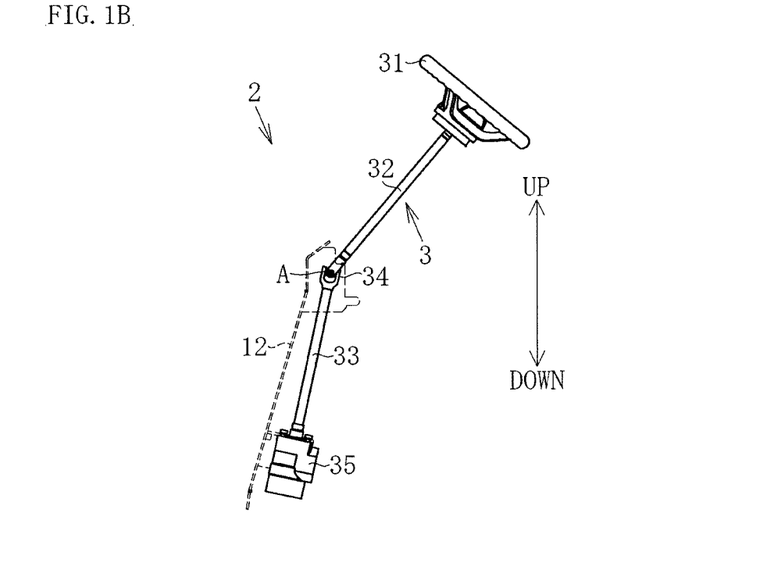
FIG. 1B is an outline view illustrating a schematic configuration of a steering device provided in the cargo handling vehicle.

As illustrated in FIG. 1B, the steering device 2 includes a steering handle 31 (hereinafter, referred to as the "handle 31"), an upper shaft 32, a lower shaft 33, a universal joint 34, and a valve device 35. The steering device 2 is attached to the cowl 12. An attachment structure of the steering device 2 to the cowl 12 will be described below with reference to FIGS. 6A to 7B.

The handle 31 is disposed in front of the operator seat 11. The upper shaft 32 and the lower shaft 33 configure a steering shaft 3. An upper end portion of the upper shaft 32 is connected to the handle 31. The lower shaft 33 is disposed below the upper shaft 32, and a lower end portion of the lower shaft 33 is connected to the valve device 35.

The universal joint 34 connects a lower end portion of the upper shaft 32 with an upper end portion of the lower shaft 33 at any angle and transmits rotary motion from the upper shaft 32 to the lower shaft 33. The universal joint 34 allows the upper shaft 32 to swing with respect to the lower shaft 33 around a predetermined horizontal axis A.

The valve device 35 includes a rotary valve (not illustrated) that rotates along with the lower shaft 33 and is connected to an oil pump (not illustrated) that sends out hydraulic steering oil and a steering cylinder (not illustrated) provided with a hydraulic chamber. The valve device 35 sends the hydraulic steering oil sent out from the oil pump to the hydraulic chamber of the steering cylinder, depending on a rotating direction and a rotating amount of the lower shaft 33. The valve device 35 that is linked with rotation of the handle 31 increases a hydraulic pressure in the steering cylinder, and thus the operator can change an orientation of the vehicle wheels 13 by using the steering device 2.

Figure 2A:
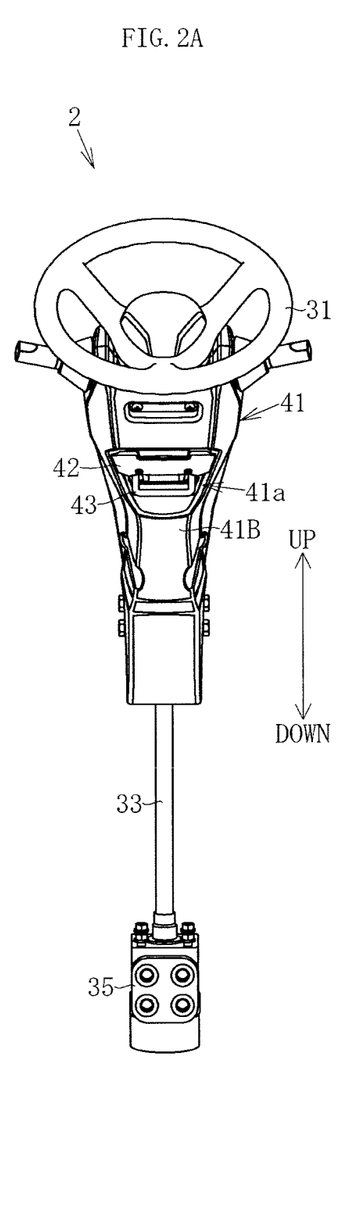
FIG. 2A is a front view of the steering device according to the embodiment.
Figure 2B:
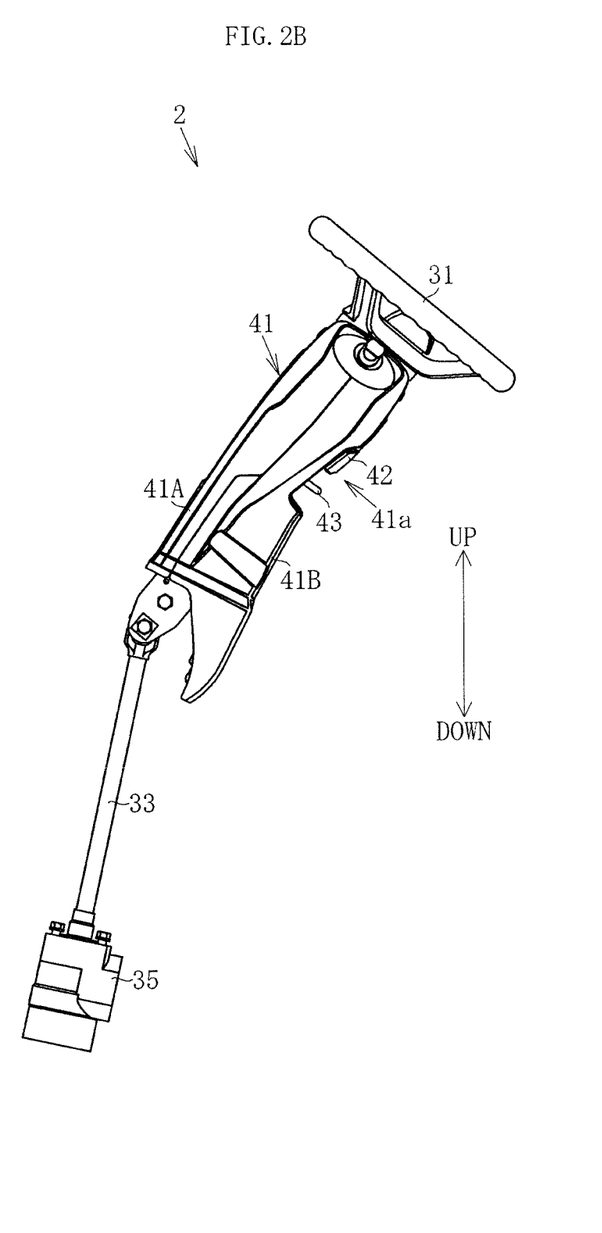
FIG. 2B is a side view thereof.

FIGS. 2A and 2B are views illustrating the external appearance of the steering device 2. FIG. 2A is a front view of the steering device 2, that is, a view when the steering device 2 is viewed from a side of the operator seat 11 in FIG. 1A. FIG. 2B is a side view of the steering device 2, that is, a view when the steering device 2 is viewed from a front side of the drawing of FIG. 1A.

As illustrated in FIGS. 2A and 2B, the steering device 2 includes a column cover 41, a parking brake release lever 42, and a tilt lock release lever 43 (hereinafter, referred to as the "release lever 43").

The column cover 41 is configured to have an upper cover 41A and a lower cover 41B and covers the upper shaft 32. The column cover 41 has an inside (space formed by the upper cover 41A and the lower cover 41B) in which the upper shaft 32 is housed. The lower cover 41B is provided with an opening portion 41a via which the parking brake release lever 42 and the release lever 43 are operated.

The release lever 43 is provided have a part that projects from the inside toward the outside of the column cover 41, and the release lever 43 is disposed below the handle 31 such that the operator who faces the handle 31 can operate the release lever 43 with any hand of the left and right hands. A detailed configuration of the release lever 43 will be described below with reference to FIGS. 3 to 4.

Figure 3:
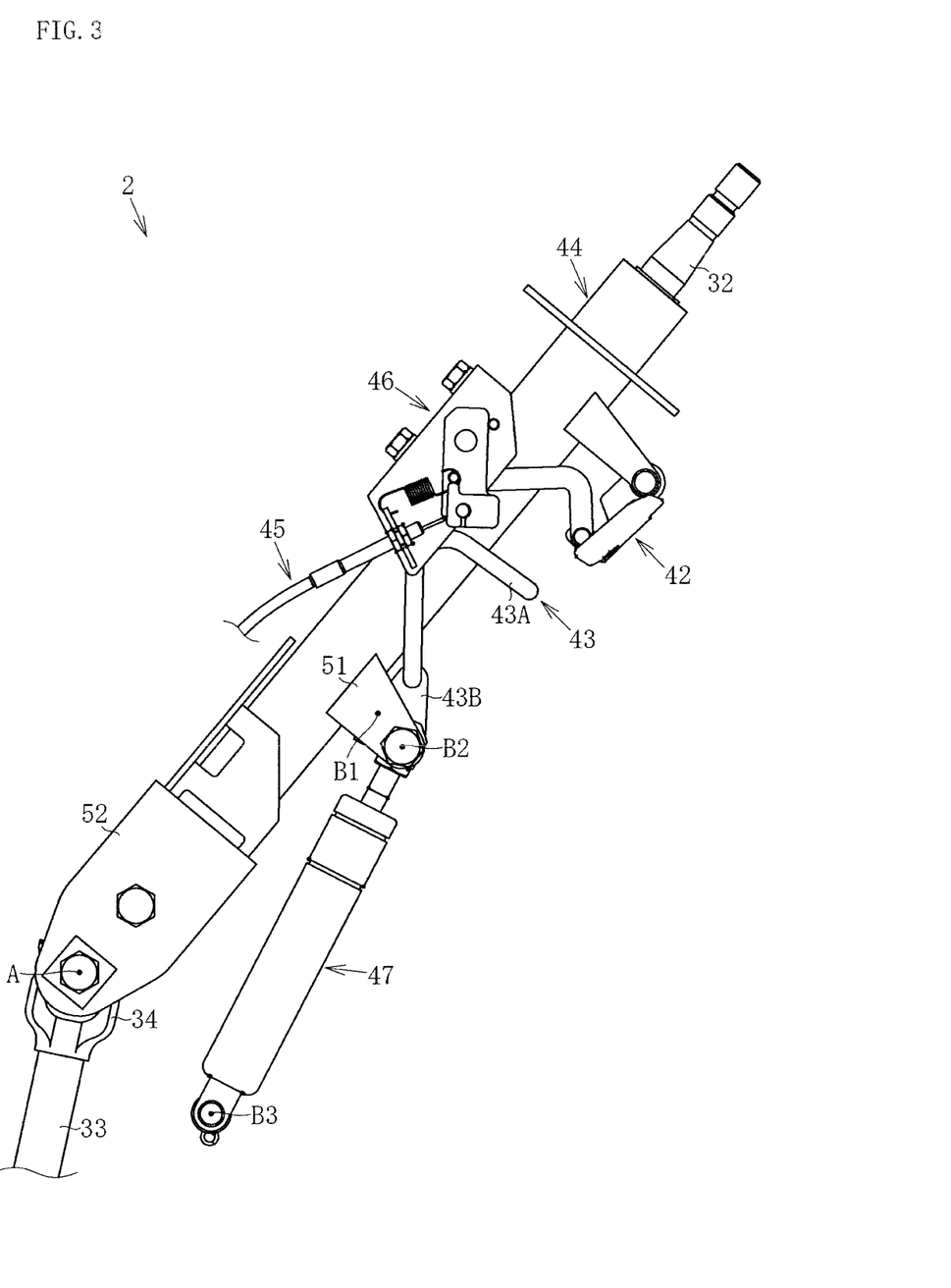
FIG. 3 is a view illustrating an internal configuration of the steering device according to the embodiment, that is, a side view thereof.
Figure 4:
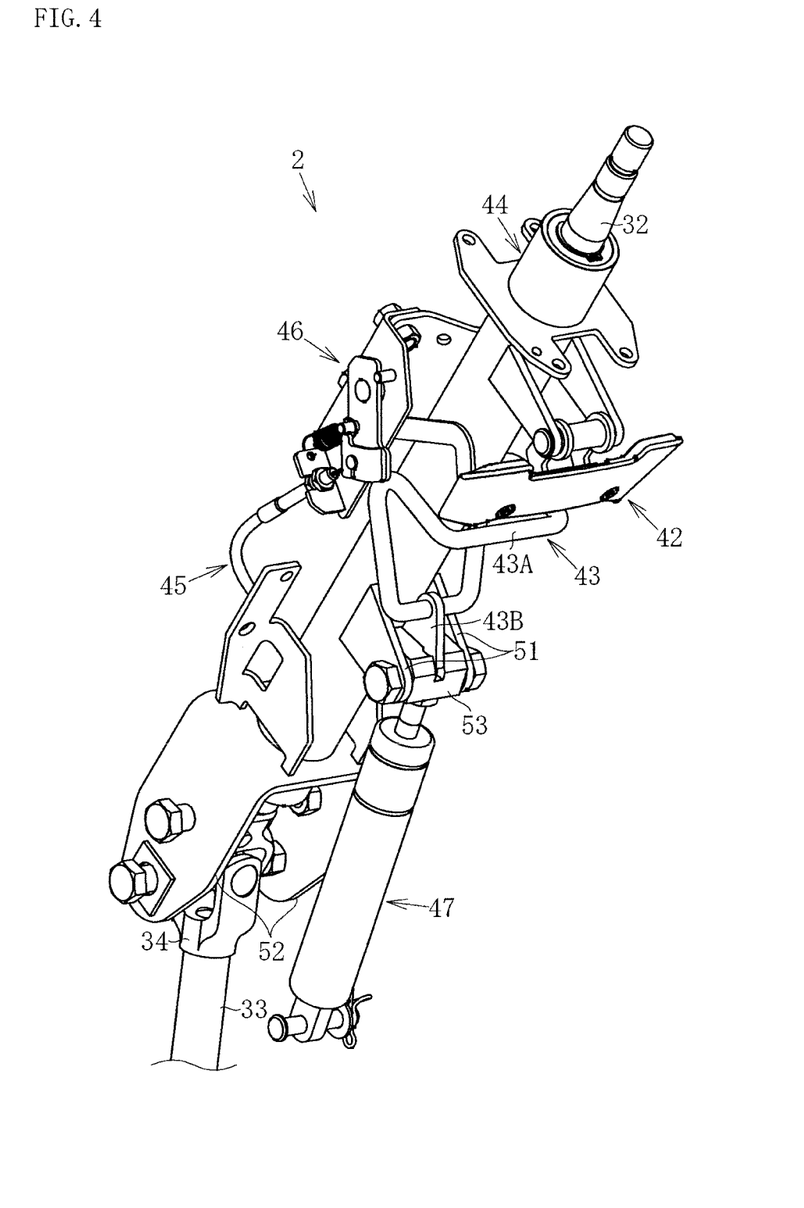
FIG. 4 is a view illustrating the internal configuration of the steering device according to the embodiment, that is, a perspective view thereof.

FIGS. 3 and 4 are views illustrating an internal configuration of the steering device 2. In FIGS. 3 and 4, the column cover 41, the handle 31, and the like are omitted.

As illustrated in FIGS. 3 and 4, the steering device 2 includes, as elements that are provided in the inside of the column cover 41, a column tube 44, a cable 45, a link mechanism 46, and a lockable gas spring 47. Axes B1 to B3 in FIG. 3 are horizontal axes orthogonal to an axial direction of the upper shaft 32.

The parking brake release lever 42 is connected to the cable 45 that operates a parking brake device (not illustrated), via the link mechanism 46. The parking brake release lever 42 is operated, and thereby it is possible to cancel inhibiting of the traveling of the main vehicle body 10 by the parking brake device (not illustrated).

The release lever 43 is disposed under the column tube 44 and is provided to be swingable around the axis B1 with respect to the column tube 44. The release lever 43 is configured to have a bar member 43A, which projects toward the outside of the column cover 41, and a pin pressing member 43B, which swings around the axis B1, thereby, pressing the lockable gas spring 47. The release lever 43 is operated, and thereby it is possible to adjust tilt of the wheel 31 with extension and contraction of the gas spring 47.

The column tube 44 covers the upper shaft 32 (except the upper and lower end portions of the upper shaft 32) and supports the upper shaft 32 rotatably via bearings (not illustrated). The column tube 44 includes gas spring backing brackets 51, cowl backing brackets 52, and a swing member 53 (refer to FIG. 4). The gas spring backing brackets 51 support the release lever 43 swingably around the axis B1 via the swing member 53 and support the gas spring 47 swingably around the axis B2. The cowl backing brackets 52 are attached to the cowl 12.

The gas spring 47 has a lock release pin 47a (refer to FIG. 5) and is a extending/contracting mechanism that is extendable and contractible when the lock release pin 47a is pressed and is not extendable and contractible when the lock release pin 47a is not pressed. The gas spring 47 is an air cylinder that is capable of being fixed at any length. The gas spring 47 connects the column tube 44 with the cowl 12. Specifically, one end portion of the gas spring 47 is provided to be swingable with respect to the column tube 44 around the axis B2, and the other end portion of the gas spring 47 is provided to be swingable with respect to the cowl 12 (that is, the main vehicle body 10) around the axis B3.

Figure 5:
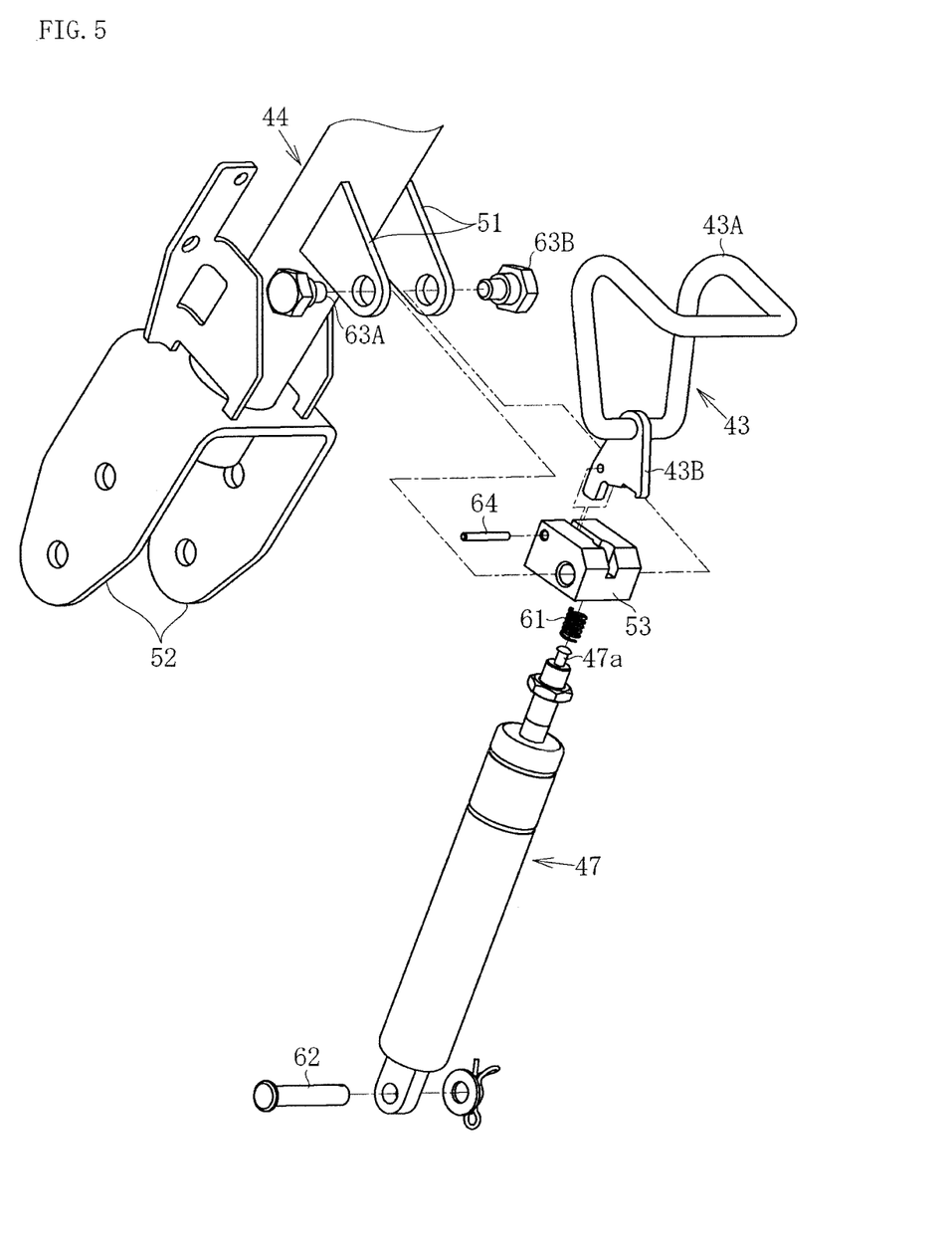
FIG. 5 is an exploded perspective view of the steering device according to the embodiment.

FIG. 5 is a view illustrating a state where the release lever 43 is detached from the column tube 44, that is, an exploded perspective view illustrating an exploded state of the release lever 43 and a configuration of connection to the release lever 43.

As illustrated in FIG. 5, the lock release pin 47a is provided on an upper end portion of the gas spring 47. The upper end portion of the gas spring 47 is inserted into the swing member 53, and the lock release pin 47a is provided to be opposite to the pin pressing member 43B of the release lever 43. When the operator pulls down the bar member 43A of the release lever 43, the pin pressing member 43B presses the lock release pin 47a such that it is possible to extend and contract the gas spring 47. The gas spring 47 is configured to be extended when the lock release pin 47a is pressed. Hence, when the operator pulls down the release lever 43, the column tube 44 is lifted upward together with the upper shaft 32, and a space between the operator and the handle 31 increases such that the operator easily gets on and off the vehicle 1. In addition, the operator presses the handle 31 downward while pulling down the release lever 43. In this manner, the gas spring 47 is contracted, and the handle 31 is disposed at a desired height.

A coil spring 61 that abuts the pin pressing member 43B is fitted on the lock release pin 47a. When the operator takes off a hand from the release lever 43, the coil spring 61 causes the pin pressing member 43B to be separated from the lock release pin 47a such that it is not possible to extend or contact the gas spring 47. A lower end portion of the gas spring 47 is supported by gas spring backing brackets 12C (refer to FIGS. 6A and 6B) of the cowl 12, which will described below, via a shaft member 62.

The gas spring backing brackets 51 are provided as a pair on the right and left sides at an interval in a right-left direction. The gas spring hacking brackets 51 project from the column tube 44 downward on the side of the operator seat 11 and are integrated with the column tube 44. Shaft members 63A and 63B, which are fixed to the swing member 53, are swingably provided on the respective gas spring backing brackets 51. The shaft members 63A and 63B according to the embodiment are configured of bolts that are fitted into female screws which are formed on side surfaces of the swing member 53 in advance. In such a configuration, the swing member 53 is provided to be swingable with respect to the gas spring backing brackets 51, and the upper end portion of the gas spring 47 is supported to be swingable around the axis B2 (refer to FIG. 3).

The cowl backing brackets 52 are provided as a pair on both right and left side surfaces of the column tube 44 and are integrated with the column tube 44. The cowl hacking brackets 52 are disposed on the sides of the universal joint 34 (refer to FIG. 4). In other words, the cowl backing brackets 52 are provided at positions with the universal joint 34 interposed therebetween in a horizontal direction.

The swing member 53 swings together with the upper end portion of the gas spring 47 with respect to the gas spring backing brackets 51. A shaft member 64 that penetrates the pin pressing member 43B of the release lever 43 is fitted into the swing member 53, and the swing member 53 supports the release lever 43 via the shaft member 64. In such a configuration, the release lever 43 is supported to be swingable around the axis B1 (refer to FIG. 3).

Figure 6A:
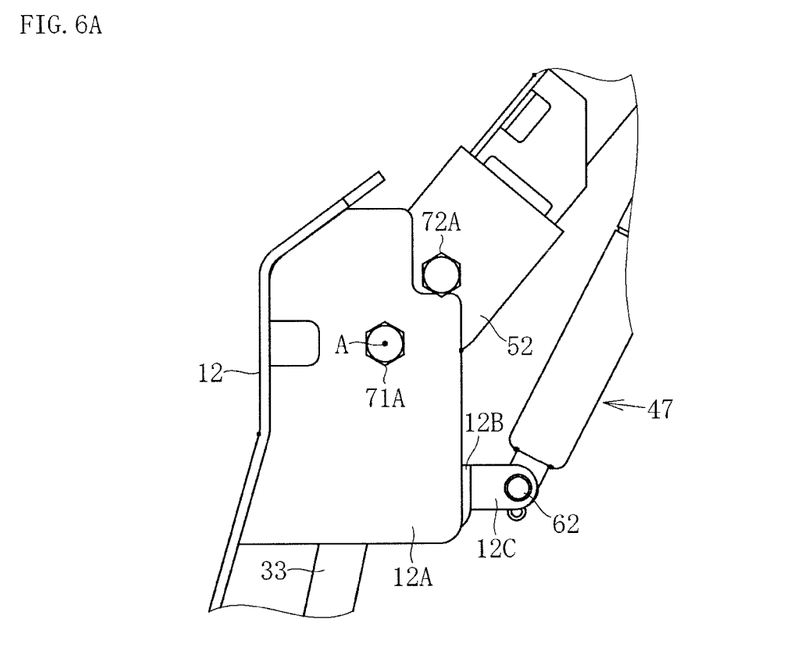
FIG. 6A is a side view thereof.
Figure 6B:
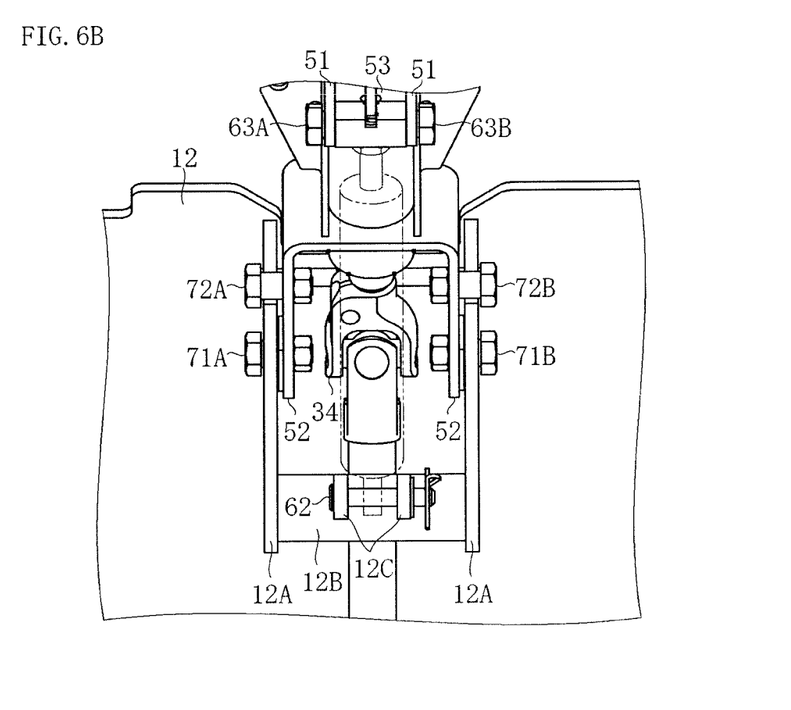
FIG. 6B is a front view thereof.
Figure 7A:
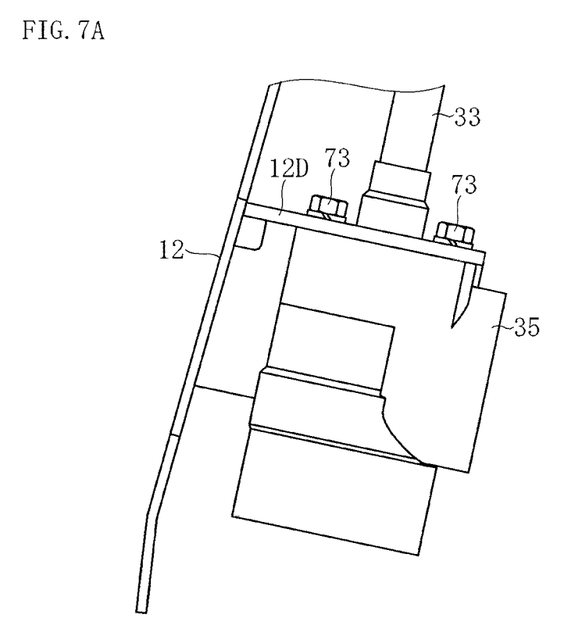
FIG. 7A is a side view thereof.
Figure 7B:
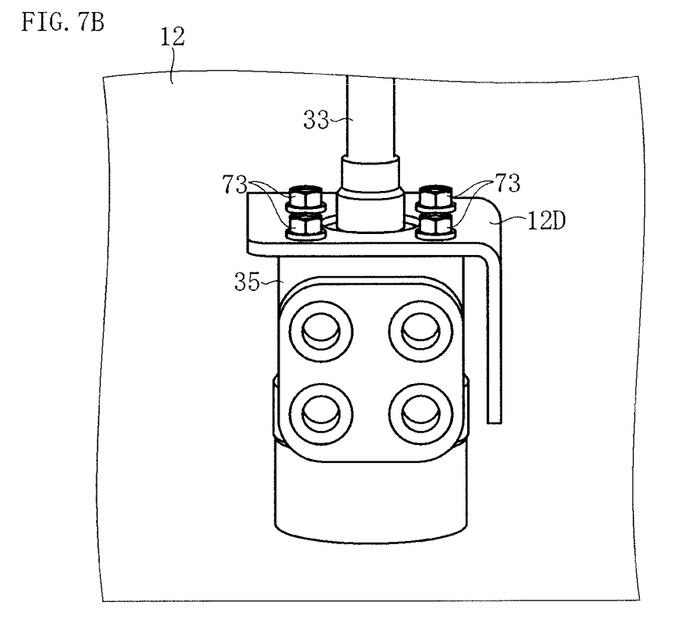
FIG. 7B is a front view thereof.

FIGS. 6A and 6B illustrate an attachment structure of the cowl hacking brackets 52 to the cowl 12, and FIGS. 7A and 7B illustrate an attachment structure of the valve device 35 to the cowl 12. In other words. FIGS. 6A to 7B illustrate an attachment structure of the steering device 2 to the main vehicle body 10. In FIG. 6B, the gas spring 47 is represented by a two-dot chain line.

As illustrated in FIGS. 6A and 6B, the cowl 12 has upper brackets 12A that are connected to the cowl backing brackets 52, respectively, a horizontal member 12B, and gas spring backing brackets 12C provided on the horizontal member 12B. The upper brackets 12A are provided as a pair on the right and left sides at an interval in a right-left direction and project from the cowl 12 toward the operator seat 11. The horizontal member 12B connects the pair of right and left upper brackets 12A with each other, and the gas spring backing brackets 12C are provided as a pair on the right and left sides at an interval in a right-left direction and project from the horizontal member 12B toward the operator seat 11. The upper brackets 12A, the horizontal member 12B, and the gas spring backing brackets 12C are integrated with the cowl 12.

The steering device 2 is attached to the cowl 12 of the main vehicle body 10 by using shaft members 71A and 71B. The shaft members 71A and 71B according to the embodiment are configured of bolts that penetrate the cowl backing brackets 52 and the upper brackets 12A. The shaft members 71A and 71B are provided at positions with the universal joint 34 interposed therebetween in the horizontal direction, thereby, being disposed to be coaxial with the horizontal axis A. The upper brackets 12A support the cowl backing brackets 52 swingably via the shaft members 71A and 71B. In such a configuration, the cowl backing brackets 52 are supported by the cowl 12 so as to swing around the horizontal axis A. The gas spring backing brackets 12C support the lower end portion of the gas spring 47 via the shaft member 62. In such a configuration, the lower end portion of the gas spring 47 is supported to be swingable around the axis B3 (refer to FIG. 3).

A swing range of the upper shaft 32 with respect to the lower shaft 33 is limited by swing regulating portions 72A and 72B provided on the cowl backing brackets 52. The swing regulating portions 72A and 72B according to the embodiment are configured of bolts fixed to the cowl backing brackets 52. The swing regulating portions 72A and 72B abut the upper brackets 12A, thereby, regulating the swing of the upper shaft 32 around the horizontal axis A.

As illustrated in FIGS. 7A and 7B, the cowl 12 has a lower bracket 12D that is connected to the valve device 35. The lower bracket 12D is formed to project from the cowl 12 toward the operator seat 11 and pass through the lower shaft 33 and is integrated with the cowl 12.

The steering device 2 is attached to the cowl 12 of the main vehicle body 10 by using fastening members 73. The fastening members 73 according to the embodiment are configured of bolts that penetrate the lower bracket 12D and are fixed to the valve device 35. The fastening members 73 are fitted to female screws, which are formed on a top surface of the valve device 35 in advance, and fasten the lower bracket 12D and the valve device 35.

In the embodiment, the following effects can be achieved.

(1) The gas spring 47 is disposed under the column tube 44 and connects the cowl 12 with the column tube 44, the column tube 44 has the cowl backing brackets 52 that are disposed on the sides of the universal joint 34 and connected to the cowl 12, and the cowl 12 supports the cowl backing brackets 52 swingably around the horizontal axis A (axis as a center of the swing of the upper shaft 32 with respect to the lower shaft 33). In this configuration, the gas spring 47 that lifts the handle 31 is not disposed on the back side of the column tube 44 but is disposed under the column tube. Hence, it is possible to enhance space efficiency and achieve a reduction in size of the steering device 2 such that the riding space is not compressed. In addition, a point at which the cowl 12 and the cowl backing brackets 52 of the column tube 44 are connected with each other can be provided on the horizontal axis A around which the upper shaft 32 swings with respect to the lower shaft 33. Hence, there is no need to provide a plurality of universal joints 34, and it is possible to improve the fixing strength of the steering device 2 to the main vehicle body 10 (cowl 12).

(2) The release lever 43 is disposed above the gas spring 47 and under the column tube 44, and thus it is possible to prevent a visual quality from being impaired.

(3) The valve device 35 supplies hydraulic oil for steering depending on the rotation of the handle 31. Hence, the hydraulic oil for steering is sent out from the valve device 35 to the steering cylinder, and thereby it is possible to perform steering by the handle 31 without mechanical connection between the lower shaft 33 and the steering cylinder.

(4) The valve device 35 is fixed to the cowl 12, and thus it is possible to more improve stability of the steering device 2, compared with a case where the valve device 35 and the cowl hacking brackets 52 of the column tube 44 are attached by different configurations from each other.

The invention is not limited to the embodiment described above, and it is possible to appropriately modify the configurations described above. For example, the embodiment may be modified and carried out as follows, and the following modifications may be appropriately combined.

As long as the lock of the gas spring 47 is released by the operation of the release lever 43, a mechanical configuration for pressing the lock release pin 47a of the gas spring 47 by the operation of the release lever 43 may be appropriately modified.

The invention may be applied to a cargo handling vehicle other than a battery powered counterbalance forklift. For example, the invention can be applied to an internal combustion forklift or a reach forklift.

What is claimed is:

1. A steering device that is connected to a cowl of a main vehicle body, the steering device comprising:
    a steering handle;
    an upper shaft to which the steering handle is connected;
    a lower shaft that is disposed below the upper shaft and fixed to the main vehicle body;
    a universal joint that connects the upper shaft with the lower shaft and allows the upper shaft to swing with respect to the lower shaft around a predetermined horizontal axis;
    a column tube that covers an outer periphery of the upper shaft;
    a lockable gas spring that supports the upper shaft via the column tube; and
    a tilt lock release lever that releases lock of the gas spring,
    wherein the gas spring is disposed under the column tube and connects the cowl with the column tube,
    wherein the tilt lock release lever is disposed above the gas spring and under the column tube,
    wherein the column tube has a cowl backing bracket that is disposed on a side of the universal joint and connected to the cowl,
    wherein the cowl backing bracket is supported by the cowl so as to swing around the horizontal axis
    wherein a lock release pin is provided on an upper end portion of the gas spring,
    wherein the gas spring is extendable and contractible when the lock release pin is pressed,
    wherein the gas spring is not extendable and contractible when the lock release pin is not pressed,
    wherein the tilt lock release lever is swingable with respect to the column tube, and configured to have a bar member and a pin pressing member, and
    wherein the pin pressing member presses the lock release pin when the bar member is pulled down.

2. The steering device according to claim 1, further comprising:
    a valve device to which the lower shaft is connected,
    wherein the valve device supplies hydraulic oil for steering depending on rotation of the steering handle.

3. The steering device according to claim 2, wherein the valve device is fixed to the cowl.

4. A cargo handling vehicle comprising:
    a main vehicle body;
    a cowl that is fixed to the main vehicle body;
    a steering handle;
    an upper shaft to which the steering handle is connected;
    a lower shaft that is disposed below the upper shaft and fixed to the main vehicle body;
    a universal joint that connects the upper shaft with the lower shaft and allows the upper shaft to swing with respect to the lower shaft around a predetermined horizontal axis;
    a column tube that covers an outer periphery of the upper shaft;
    a lockable gas spring that supports the upper shaft via the column tube; and
    a tilt lock release lever that releases lock of the gas spring,
    wherein the gas spring is disposed under the column tube and connects the cowl with the column tube,
    wherein the tilt lock release lever is disposed above the gas spring and under the column tube,
    wherein the column tube has a cowl backing bracket that is disposed on a side of the universal joint and connected to the cowl,
    wherein the cowl supports the cowl backing bracket swingably around the horizontal axis,
    wherein a lock release pin is provided on an upper end portion of the gas spring,
    wherein the gas spring is extendable and contractible when the lock release pin is pressed,
    wherein the gas spring is not extendable and contractible when the lock release pin is not pressed,
    wherein the tilt lock release lever is swingable with respect to the column tube, and configured to have a bar member and a pin pressing member, and
    wherein the pin pressing member presses the lock release pin when the bar member is pulled down.

5. The cargo handling vehicle according to claim 4, further comprising:
    a valve device to which the lower shaft is connected,
    wherein the valve device supplies hydraulic oil for steering depending on rotation of the steering handle.

6. The cargo handling vehicle according to claim 5, wherein the valve device is fixed to the cowl.

* * * * *